United States Patent [19]
Sentman

[11] Patent Number: 5,377,417
[45] Date of Patent: Jan. 3, 1995

[54] THREAD PITCH CYLINDER GAGE

[76] Inventor: Gerald K. Sentman, 831 S. Post Rd., Indianapolis, Ind. 46239

[21] Appl. No.: 50,222
[22] PCT Filed: Oct. 29, 1990
[86] PCT No.: PCT/US90/06276
§ 371 Date: Apr. 30, 1993
§ 102(e) Date: Apr. 30, 1993
[87] PCT Pub. No.: WO92/08099
PCT Pub. Date: May 14, 1992

Related U.S. Application Data

[63] Continuation-in-part of Ser. No. 248,433, Sep. 23, 1988, Pat. No. 4,965,936.

[51] Int. Cl.$^6$ ................................................ G01B 3/48
[52] U.S. Cl. ................................ 33/199 R; 33/555.1; 33/794; 33/827; 33/829; 33/542
[58] Field of Search ................. 33/794, 797, 798, 827, 33/829, 501.4, 555.1, 555.2, 542, 199 R, 199 B

[56] References Cited

U.S. PATENT DOCUMENTS

| | | | |
|---|---|---|---|
| 890,394 | 6/1908 | Ahrens . | |
| 2,249,954 | 7/1941 | Hellberg et al. . | |
| 2,434,535 | 1/1948 | Anders . | |
| 2,595,917 | 5/1952 | Bath et al. . | |
| 2,604,703 | 7/1952 | Meyer . | |
| 2,661,540 | 12/1953 | Dulligan . | |
| 2,661,541 | 12/1953 | Dulligan . | |
| 2,782,521 | 2/1957 | Parker et al. | 33/199 R |
| 2,841,877 | 7/1958 | Coley . | |
| 3,516,166 | 6/1970 | Moore | 33/199 R |
| 3,827,154 | 8/1974 | Kaifesh | 33/199 R |
| 4,118,867 | 10/1978 | Lendi et al. . | |
| 4,480,388 | 11/1984 | O'Brien | 33/199 R |
| 4,590,678 | 5/1986 | Arredondo | 33/199 R |
| 4,965,936 | 10/1990 | Sentman | 33/199 R |

FOREIGN PATENT DOCUMENTS

| | | |
|---|---|---|
| 868358 | 2/1953 | Germany . |
| 8600120 | 8/1987 | Netherlands . |
| 551356 | 2/1943 | United Kingdom . |
| 920540 | 3/1963 | United Kingdom . |
| 164682 | 1/1965 | U.S.S.R. . |

OTHER PUBLICATIONS

Product literature, the MTG System of Internal and External Gaging, MTG Incorporated, 20 pages, publication date unknown.

*Primary Examiner*—William A. Cuchlinski, Jr.
*Assistant Examiner*—Alvin Wirthlin
*Attorney, Agent, or Firm*—Woodard, Emhardt, Naughton, Moriarty & McNett

[57] ABSTRACT

A thread pitch cylinder gage for an internally threaded bore in a workpiece, according to one embodiment, includes a gage post having a bearing surface extending through an externally threaded sleeve. The sleeve is trapped on the bearing surface by a retaining cap at the end of the gage post. A finger on the bearing surface engages a notch in the sleeve to prevent rotation of the sleeve relative to the bearing surface, while permitting relative axial motion. The sleeve includes two collections of retaining cavities with balls trapped therein, one at each end of the sleeve. The cavities, and therefore the balls, are centered between the flanks of a thread on the sleeve, and the balls are radially slidable between a retracted and a locked position. The bearing surface includes a plurality of sloped cam surfaces radially aligned with the balls in the sleeve. The cam surfaces are adapted to urge the balls radially outward when the gage post is pulled axially relative to the sleeve, until the balls contact, and are locked against, the threads in the workpiece bore. The two collections of balls, when in the locked position, establish the pitch cylinder and pitch axis of the threaded bore.

26 Claims, 12 Drawing Sheets

THREAD PITCH CYLINDER GAGE

CROSS-REFERENCE TO RELATED APPLICATION

This application is a continuation-in-part of patent application Ser. No. 07/248,433, filed Sep. 23, 1988, now U.S. Pat. No. 4,965,936 issued Oct. 30, 1990.

BACKGROUND OF THE INVENTION

This invention relates to a gage for determining the location of the pitch cylinder of a threaded post or bore in a workpiece. The gage of the present invention is also useful in determining the amount of positional tolerance a threaded feature has used on the workpiece, orientation of the pitch axis relative to the surface of the workpiece, and thread feature tolerances.

Several methods exist for inspecting threaded elements on a workpiece, such as a threaded post or bore. Several features of the threaded elements are inspected, including position on the workpiece, orientation and concentricity with other features on the workpiece, perpendicularity with the surface of the workpiece, and pitch diameter. Typically, inspection of each of these features is performed with a separate gage.

For instance, positional accuracy is determined using a functional gage with hole locations corresponding to the correct bore locations in the workpiece. Separate unthreaded gage pins pass through the functional gage holes and into the workpiece bores only if the bore locations are within tolerance. In some instances, the unthreaded gage pins are integral with the functional gage. In either case, inspections of this type are not based on the pitch cylinder axis of the threaded element on the workpiece, which induces some error into the inspection. Moreover, even the use of a threaded gage pin does not necessarily establish the proper pitch cylinder axis due, for instance, to perpendicularity errors in the threaded workpiece bore.

The pitch cylinder is an imaginary cylinder formed such that the diameter of the cylinder intersects the thread profile, or flanks, where the width of the thread and groove are equal. Ideally, the pitch cylinder of a threaded feature is a cylinder formed by thread pitch diameters spaced along the length of the feature. The axis of the pitch cylinder can be defined using a minimum of four points of contact, axially and circumferentially spaced in two groups along the length of the threaded feature. Once the axis of the pitch cylinder is defined, positional aspects, for instance, can be easily gaged. To applicant's knowledge, there are no inspection gages available that accurately locate the axis of the pitch cylinder of the threaded feature to be inspected. A gage threaded to the pitch cylinder can establish the pitch cylinder axis only when it is exactly the size of the threaded feature, and when there is no play or slop when it is engaged onto the threaded feature. A threaded gage pin of this sort would be virtually impossible to engage, and, at any rate, relatively expensive to manufacture.

Typically, inspection gages are limited to a single function—i.e., determining positional accuracy, assessing perpendicularity, or inspecting the limits of size of the threaded feature. Thus, several gages are required to inspect one workpiece. Due to the precision machining of these gages, their cost is generally high. In order to reduce this cost, one option is to provide a multi-function gage, not yet available in the prior art, useful for inspecting thread position, orientation and limits of size of a threaded feature on a workpiece.

SUMMARY OF THE INVENTION

These and other shortcomings of prior art inspection gages are overcome by a pitch cylinder gage with a rotary camshaft mounted within a cylindrical housing having a threaded outer surface adapted to engage the threads of a threaded bore on a workpiece. The housing defines axially separated sets of cavities extending radially through the threaded outer surface and the camshaft includes a rotary cam portion radially adjacent each set of cavities. The gage further includes a flank contact element positioned within each of the cavities, the flank contact elements each being radially extendable into contact with a thread flank of the bore in response to rotation of the rotary camshaft with respect to the housing.

According to another aspect of the invention, a pitch cylinder gage is provided with at least four means for tangentially engaging the thread grooves of a threaded feature on a workpiece, and with a retaining means for the engaging means which includes means for axially spacing a first plurality of the engaging means and for circumferentially spacing a second plurality of the engaging means. The pitch cylinder gage also includes rotatable means for moving the tangentially engaging means into engagement with the thread grooves whereby a cylinder coaxial with the pitch cylinder of the threaded feature is spatially defined. The rotatable moving means includes a cam element of circumferentially varying radius rotatably coupled to the retaining means and adapted to contact the tangential engaging means and move them into engagement with the thread grooves when rotated relative to the retaining means.

According to another aspect of the invention, a pitch cylinder gage is provided with a cylindrical housing having a threaded outer surface adapted to engage the threads of a threaded bore on a workpiece, the housing defining axially separated sets of cavities extending radially through the threaded outer surface. The pitch cylinder gage includes an elongated post concentric with and rotatable within the housing, the post having a circumferentially varying radius defining a rotatably actuated cam. The pitch cylinder gage also includes a flank contact element positioned within each of the cavities, the flank contact elements each being radially extendable into contact with the thread flank of the bore in response to rotation of the cam with respect to the housing.

It is an object of the present invention to provide an accurate multi-functional gage for use in inspecting features of a threaded element on a workpiece. More particularly, it is an object to provide a gage that will properly and accurately locate the pitch cylinder axis of the threaded element, regardless of the feature size of the element.

Another object is to provide, in a single gage, the capability of determining whether the element is within tolerance as to position, orientation, perpendicularity and thread size. Further objects and benefits of the present invention will be apparent from the following description and accompanying figures.

DESCRIPTION OF THE PREFERRED EMBODIMENT

Figure 3:
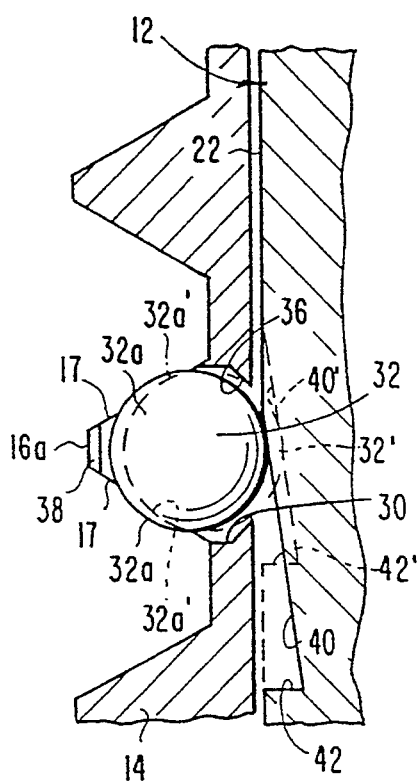
FIG. 3 is an enlarged cross sectional view of the thread pitch cylinder gage shown in FIG. 2, taken along line 3—3 and viewed in the direction of the arrows.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
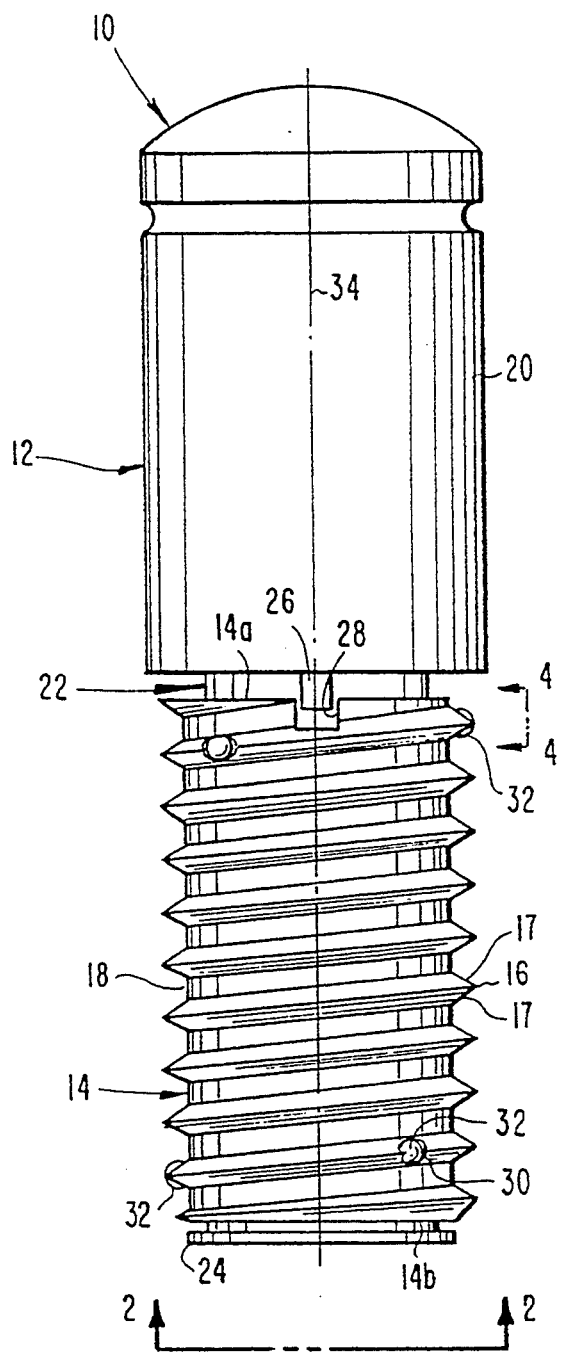
FIG. 1 is a side elevational view of the thread pitch cylinder gage of one embodiment of the present invention.

The thread pitch cylinder gage 10 of the first embodiment of the present invention comprises a gage post 12 and an externally threaded sleeve 14, as shown in FIG. 1. Sleeve 14 includes a continuous thread 16, the thread 16 having flank portions 17. The sleeve 14 is externally threaded for use with a workpiece having an internally threaded bore that is to be inspected. In this preferred embodiment, the thread 16 is of the same size or smaller than the maximum material condition (MMC) size of the internal threads of the workpiece. The root diameter 18 of the threaded sleeve is the same size or smaller than the MMC size of the minor diameter of the internal threads of the workpiece.

The gage post 12 includes a gage head 20, a bearing surface 22 and a retaining cap 24. The gage head 20 is precision machined so that its outer diameter equals, in the preferred embodiment, the maximum material condition size of the major diameter of the screw or bolt it represents. As will be described further herein, the gage head 20 is precision machined to provide a gauging surface to be used in conjunction with a functional gage, or to be used by other inspection techniques (such as CMM surface plate inspection) to determine the amount of positional tolerance used of the threaded bore of the workpiece.

The bearing surface 22 extends through the interior of the externally threaded sleeve 14. The retaining cap 24 is suitably affixed to the bearing surface 22 to trap the sleeve 14 between the gage head 20 and the retaining cap 24 of the gage post 12. In the preferred embodiment, the retaining cap 24 is a ring that is press-fit onto the bearing surface 22. The retaining cap 24 may also comprise a ring that is press-fit onto a reduced diameter portion of bearing surface 22. Alternatively, the retaining cap can be integral, or one-piece, with the gage post 12, with the sleeve 14 engaged between the cap 24 and the head 20 using a typical cold shrink-fit process. The outer diameter of the retaining cap may not exceed the MMC size of the minor diameter of the internal threads in the workpiece, otherwise the gage 10 cannot enter the workpiece bore. The bearing surface 22 has a maximum outer diameter equal to the least material condition (LMC) size of the pitch diameter minus 1.5×the best wire size (that is, the best wire size used in determining the pitch diameter of the workpiece threads in a standard gauging procedure). The bearing surface 22 includes a key 26 projecting axially from the gage head 20. The sleeve 14 includes a notch 28 complementary to key 26, so that when the sleeve 14 is installed on gage post 12, the key 26 will engage in the notch 28 to prevent rotation of sleeve 14 relative to bearing surface 22.

Figure 2:
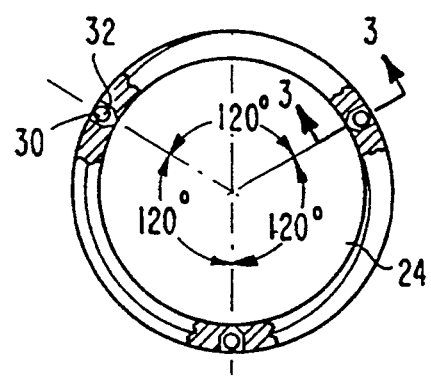
FIG. 2 is a partial cutaway end view of the thread pitch cylinder gage shown in FIG. 1.

Adjacent each end of the externally threaded sleeve 14 is a collection of retaining cavities 30, each formed by a bore through the externally threaded sleeve 14. A ball 32 is trapped within each of the retaining cavities 30. In the preferred embodiment, there are three retaining cavities 30 at each end of the sleeve 14, each of the cavities circumferentially spaced at 120 degree intervals around the sleeve, as illustrated in FIG. 2. Moreover, as shown in FIG. 1, the retaining cavities at end 14a are circumferentially offset from the retaining cavities at end 14b of the externally threaded sleeve 14, in order to establish a maximum distance between the retaining cavities at end 14a and the cavities at end 14b, as dictated by the length of the thread in the workpiece. In the illustrated embodiment, the offset between the cavities at ends 14a and 14b is coincidentally about 60 degrees; however, any other angular arrangement between the groups at ends 14a and 14b is acceptable, provided the balls in the two groups are situated as far apart as possible given the length of the gage. This arrangement of retaining cavities and balls between ends 14a and 14b ensures a true location for the axis 34 defined by the two collections of retaining cavities and balls, that corresponds to the pitch cylinder axis of the internally threaded bore of the workpiece.

Figure 4:
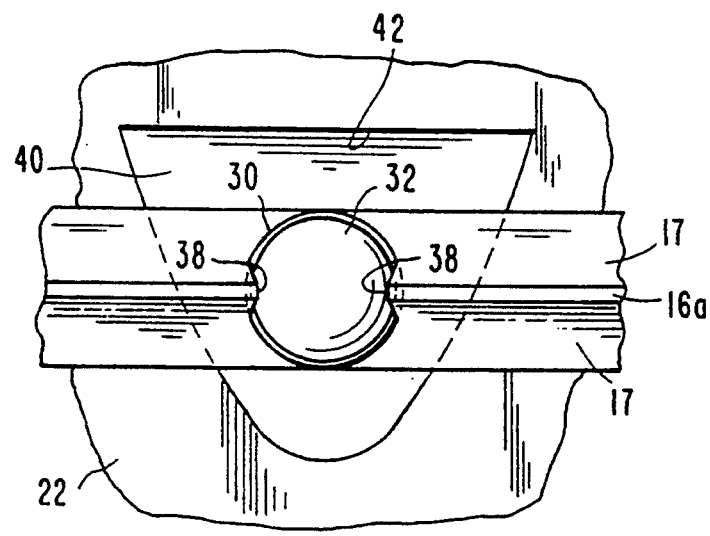
FIG. 4 is an enlarged view of the ball and retaining cavity in the thread pitch cylinder gage shown in FIG. 1, taken along line 4—4 and viewed in the direction of the arrows shown, with a portion of the sleeve cut away.

The details of the retaining cavity 30 and ball 32 configuration are described with reference to FIGS. 3 and 4. The retaining cavity 30 is cut through the thread 16 of the sleeve 14 and includes a chamfered portion 36 at the inner diameter of sleeve 14. The chamfer 36 reduces the size of retaining cavity 30 to restrain the ball 32 within the cavity 30, while allowing the ball to project beyond the inner diameter of sleeve 14 into the position 32', as shown in FIG. 3. The chamfer 36 is provided primarily as an assembly convenience to retain the balls as the gage post is inserted into the sleeve 14. The chamfer 36 may be eliminated to reduce the precision machining required, at the expense of a more cumbersome procedure to assemble the gage 10. The retaining cavity 30, and consequently the ball 32, are centered between the flanks 17 of the thread 16. The crown 16a of the thread 16 is crimped at location 38 on opposite sides of retaining cavity 30 that is cut through thread 16, as shown in FIG. 4. The crimped portions 38 retain the ball 32 within the cavity 30.

It is seen in FIG. 3 that when the ball 32 is positioned as shown, the outer surface of the ball extends beyond the flanks 17 of the thread 16. The ball portions 32a that extend beyond the flanks 17 tangentially engage the thread grooves of the internally threaded bore of the workpiece when the ball is positioned as shown in solid lines in FIG. 3. When the ball portions 32a are held in this tangential contact with the internal thread groove of the workpiece at the six locations along the externally threaded sleeve 14, the sleeve 14 is, effectively, locked into contact with the internally threaded bore of the workpiece. In the preferred embodiment, the diameter of the balls 32 is equal to the best wire size recommended in standard practice for the particular thread pitch of the workpiece threads. Balls sized in this manner will contact the flanks of the thread grooves at the pitch diameter of the workpiece threaded bore to insure that the balls will properly lock in the bore and that the pitch cylinder axis will be properly defined.

In order to urge the ball 32 into contact with the internal threads of the workpiece, the bearing surface 22 of the gage post 12 is provided with a cam surface 40 that is indented from the bearing surface and sloped as shown in FIG. 3. The cam surface 40 slopes radially inwardly from the outer diameter of bearing surface 22 toward end surface 42. When the ball 32 is in the locked position, as shown in the solid lines of FIG. 3, the cam surface 40 is situated as shown so that the ball 32 has just begun to contact the incline of cam surface 40. When the ball is in the retracted position 32'. as shown in the dashed lines of FIG. 3, the cam surface is in position 40' and the ball projects radially inwardly from the inner diameter of sleeve 14. In the retracted position 32', the ball portions 32a' are within the flanks 17 of the thread 16 so that the ball portions 32a' do not contact the internal threads of the workpiece.

In the preferred embodiment, the cam surface 40 is formed by grinding the gage post 12 at an angle, which causes the cam surface to assume a parabolic shape as shown in FIG. 4. The steepness of the angle of the cam surface will determine how much axial motion of the gage post 12 is required to move the balls 32 between the retracted and locking positions. The amount of axial motion of the gage post is also determined by the actual pitch diameter of the workpiece threaded bore—that is, when the workpiece pitch diameter is at the small end of the tolerance band, the balls 32 are urged into contact with the workpiece threads while the balls are near the middle of the cam portions 40. When the workpiece pitch diameter is at the large end of the tolerance band, the balls must be moved farther along the cam surface before the balls contact the workpiece threads, in some cases, until the balls are on the bearing surface beyond the junction between the cam surface and the bearing surface. This feature of the thread pitch cylinder gage 10 allows the gage to be used to establish a pitch cylinder axis, regardless of the feature size of the workpiece threads.

Figure 5:
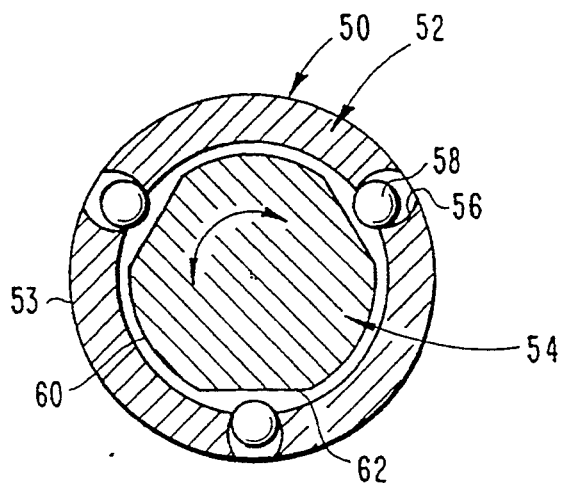
FIG. 5 is a cross sectional view of the thread pitch cylinder gage of a second embodiment of the present invention, the cross section being taken along a thread of the gage.

In a second embodiment of the present invention, a thread pitch cylinder gage 50 includes an externally threaded sleeve 52 with a plurality of retaining cavities 56 and balls 58, as shown in FIG. 5, similar to that employed in the sleeve 14 of the former embodiment. For simplicity, the cross-section in FIG. 5 is taken along the continuous thread 53 of sleeve 52. Gage post 54 replaces gage post 12 of the previous embodiment. Unlike the former embodiment, however, the gage post 54 does not include the key 26 and notch 28 arrangement, because gage post 54 is adapted to rotate within externally threaded sleeve 52. The gage post 54 of the second embodiment includes a flat section 62 radially adjacent each of the retaining cavities 56. Between each flat section 62 is a curved bearing surface 60 that has the same diameter as bearing surface 22 of the first embodiment. When each of the flat sections 62 are aligned with the retaining cavities 56 and balls 58, the balls are in the retracted position. However, when gage post 54 is rotated relative to sleeve 52, the flat sections 62 act as cam surfaces to gradually force the balls 58 outwardly until the balls contact the internal threads of the workpiece, in a similar fashion to that previously described with reference to the first embodiment. In the normal circumstance, the balls will lock between the flat sections and the internal threads. However, if the pitch diameter is sufficiently large, the gage post 54 may be rotated further relative to the sleeve 52 so that the balls ride up the flat sections 62 onto the bearing surface 60.

In order to thread the sleeve 52 of this second embodiment into the workpiece internally threaded bore, a key and notch arrangement similar to that employed in the first embodiment can be provided. However, since the gage post 54 must be allowed to rotate within sleeve 52 in order to lock or retract the balls 58, some axial separation between the key and notch must be provided so that they can be completely disengaged to allow the required rotation.

In the second embodiment as illustrated, the gage post 54 has a constant cross-section along its length. Thus, the balls at either end of the sleeve 52 must be axially aligned so that the flat sections 62 will coincide with the circumferentially spaced balls at both ends. In order to accommodate the circumferential offset between the ball locations at one end of the sleeve 52 relative to the other end, as described in the discussion of the first embodiment, an additional set of flat surfaces would be required midway along the curved bearing surfaces 60.

Figure 6:
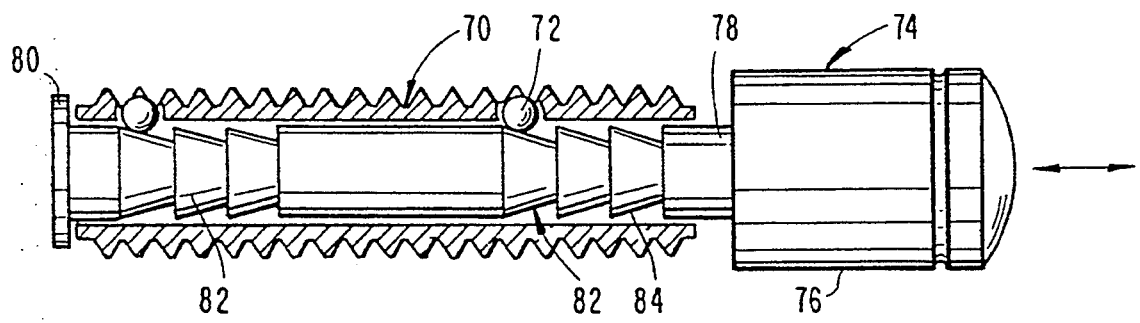
FIG. 6 is a side partial cross sectional view of the thread pitch cylinder gage of a third embodiment of the present invention.

In a third embodiment of the present invention, illustrated in FIG. 6, the externally threaded sleeve 70 and ball assembly 72 is identical to the externally threaded sleeve 14 and its ball assembly in the first embodiment. The gage post of the third embodiment includes a gage head 76 similar to gage head 20, a bearing surface 78 and a cap 80 similar to retaining cap 24 of the first embodiment. The bearing surface 78, however, includes a pair of cam sections 82 located radially adjacent each of the ball assemblies 72 in the externally threaded sleeve 70. Each of the cam sections 82 includes a frusto-conical portion 84 beneath each ball in the ball assemblies 72. When the gage post 74 is translated axially relative to the sleeve 70, in the direction indicated by the heavy arrows in FIG. 6, the balls of the ball assemblies 72 are urged radially outwardly by the frusto-conical portions 84 in the same manner that cam surfaces 40 operate in the first embodiment.

Figure 7:
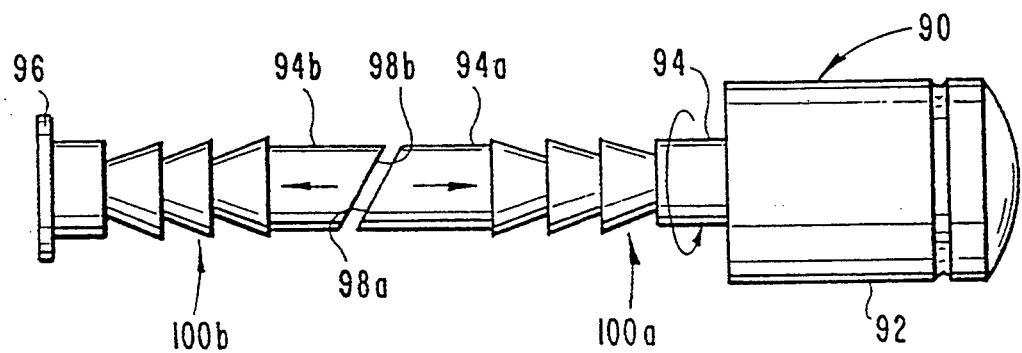
FIG. 7 is a side view of the gage post of the thread pitch cylinder gage of a fourth embodiment of the present invention.

In FIG. 7, the gage post assembly 90 of a fourth embodiment of the present invention is illustrated. The gage post assembly 90 is adapted to replace the gage post 74 of the immediately previous embodiment. The gage post assembly 90 includes a gage head 92, a bearing surface 94 and a cap 96. The bearing surface 94 is split into a first half 94a and a second half 94b. The split between the bearing surface halves 94a and 94b is at the inclined cam ends 98a and 98b, respectively. The first half 94a of the bearing surface includes a frusto-conical portion 100a, while the second half 94b includes a reverse frusto-conical portion 100b.

In this fourth embodiment, the gage post 90 is adapted to rotate relative to the externally threaded sleeve, as shown by the counterclockwise arrow in FIG. 7. As the gage post 90 is rotated in the direction of the arrow, the inclined cam ends 98a and 98b rotate against each other forcing the first and second halves 94a and 94b apart, as shown by the heavy arrows. As the first and second halves 94a and 94b are forced apart, the frusto-conical sections 100a and 100b, respectively, urge the balls outwardly into the locking position. One advantage of this fourth embodiment is that the gage post 90 will maintain a minimum of six points of contact with the thread flanks, even when the thread is tapered, that is when one end of the thread is larger than the other end. This particular embodiment, consequently, is also useful for gauging tapered pipe threads.

Figure 8:
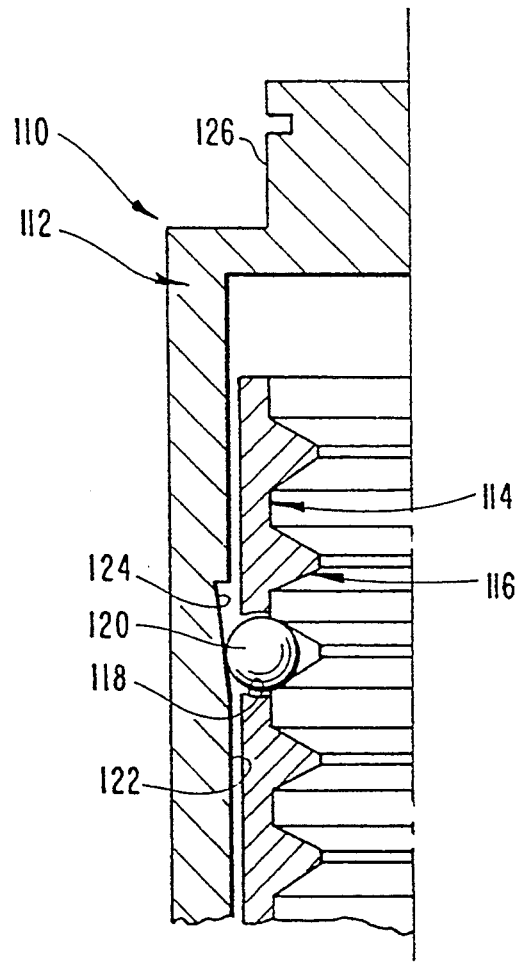
FIG. 8 is a side cross sectional view of the thread pitch cylinder gage of a fifth embodiment of the present invention adapted for use with a male threaded workpiece.

Turning now to FIG. 8, a longitudinal cross sectional view is shown of a thread pitch cylinder gage 110 adapted for use with a male threaded post on the workpiece. The gage 110 includes a hollow gage post 112 and an internally threaded sleeve 114. The sleeve 114 includes internal threads 116, recesses 118 and balls 120 trapped within the recesses 118. The gage post 112 includes an internal bearing surface 122 and an internal cam surface 124 similar to the bearing surface 22 and cam surface 40 described with reference to the first embodiment of the invention, except that the surfaces are on the inner diameter of the gage post 112 rather than on the outer diameter, and also includes a gage head 126. The thread pitch cylinder gage 110 for male threaded workpieces operates in the same manner as the thread pitch cylinder gage 10 for the female threaded workpiece. It is also apparent from the foregoing description that the gages described in the third, fourth and fifth embodiments can also be adapted for use with a male threaded workpiece.

Figure 9:
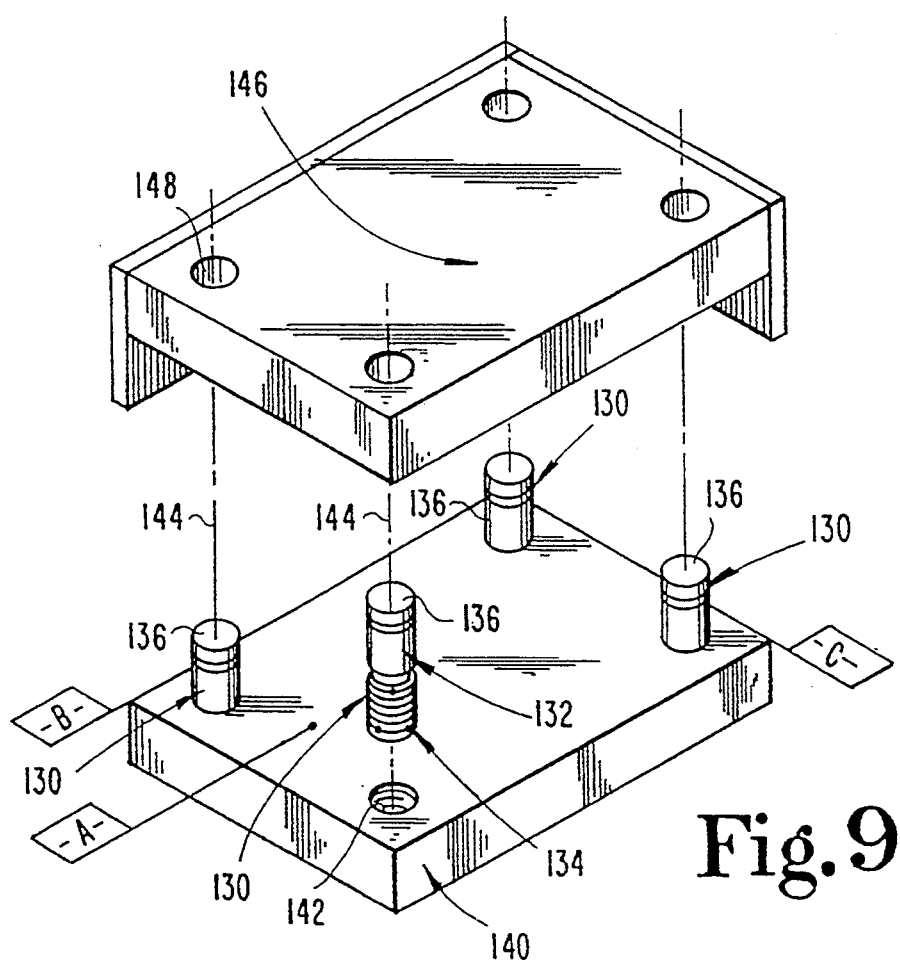
FIG. 9 is an illustration of the use of the thread pitch cylinder gage of the present invention in conjunction with a workpiece and a functional gage.

The use and operation of the thread pitch cylinder gage of the present invention is illustrated with reference to FIG. 9. For purposes of clarity, the pitch cylinder gage 130 illustrated in FIG. 9 is, in all respects, identical to the thread pitch cylinder gage 10 of the first preferred embodiment. In the illustration, a workpiece 140 includes four internally threaded bores 142. A pitch cylinder gage 130 is threaded into each of the bores 142 and locked within the bores by pulling upwardly on the gage post 132. As previously described, when the gage post 132 is translated axially relative to the externally threaded sleeve 134, the six balls trapped within the recesses in the sleeve 134 are urged outwardly by cam portions on the gage post 132 so that the balls tangentially engage the internal threads of the threaded bore 142. The pattern of balls in the externally threaded sleeve 134 spatially define a cylinder having an axis 144 that is coaxial with the pitch cylinder axis of the threaded feature, regardless of the feature size of the threaded bores 142.

With the thread pitch cylinder ages 130 locked in position within threaded bores 142 of the workpiece 140, a functional gage 146 having a number of gage holes 148 is placed over the gage heads 136 of the pitch cylinder gages exposed above the surface of the workpiece 140. As previously described, the gage head 136 of the thread pitch cylinder gage 130 has an outer diameter equal to the maximum material condition (MMC) size of the major diameter of the screw or bolt it represents. Thus, the thread pitch cylinder gages 130 in conjunction with the functional gage 146 identifies the presence of interference between outside diameters of screw, represented by the pitch cylinder gage, and the bores in the mating part, represented by the functional gage, when the mating part is engaged with the workpiece. When used in this manner, the thread pitch cylinder gage 130 complies with the measurement standards defined in the American National Standards Institute (ANSI) Standard Y14.5M-1982, paragraph 5.5.

It is apparent that the gage 130 can be used in conjunction with a coordinate measuring machine, rather than with a functional gage. Once the inspection operation is complete, the gage 130 can be unlocked from the threaded bore 142 by pushing the gage post 132 into the threaded sleeve 134 until the balls follow the cam surfaces on the gage post into the retracted position. The pitch cylinder gage 130 can then be unscrewed from the bore 142 in the normal fashion.

The thread pitch cylinder gage 130 can also be used as a go/no-go gage for the pitch cylinder diameter. The sleeve 134 is threaded to coordinate with the thread features specified for a particular threaded bore 142 of the workpiece. If, when the installed gage post 132 is pulled axially relative to the externally threaded sleeve 134, the balls in the sleeve 134 do not lock in the internally threaded bore 142, then it is known that the pitch cylinder diameter of the internally threaded bore 142 in the workpiece 140 exceeds the upper diameter limit for the class of thread specified. If the thread size is too large, the pitch cylinder gage will have some sideplay when the gage is fully situated within the threaded bore. Moreover, since the pitch cylinder diameter of the threads on the externally threaded sleeve 134 are machined to the lower size limit for the specified workpiece threads, the gage will not go into the bore 142 if the lower limit of the pitch cylinder diameter of the threaded bore 142 has not been met.

The thread pitch cylinder gage 130 can also be used to determine violations of the maximum material condition (MMC) of the thread form for the threaded bore 142. If the pitch cylinder gage will not completely enter the threaded bore 142, the MMC of the entire thread form has been violated, such as will typically result from the bore being tapped in a separate operation from the tap drilling step. Thus, the pitch diameter gage can be used to determine if the internal threads of the bore 142 are outside a particular limit of concentricity with the minor diameter of the bore.

Finally, the thread pitch cylinder gage 130 can be used to assess the perpendicularity of the bore 142 with the surface of the workpiece 140. In this instance, the gage 130 gives a visual indication of the perpendicularity. If the degree of non-perpendicularity is too small to detect visually, inspection equipment can make the requisite measurements relative to the precision machined surface of the gage head 136.

The present invention encompasses replacing the ball in the thread pitch cylinder gage with an element sized to tangentially engage at least one point in the thread groove. Since the thread is generally tapped in a single operation, the form of the thread groove will be constant and determinable. Thus, a pitch cylinder gage in which the ball elements are replaced with radially extending pins that contact the thread root, for instance, will also define an axis coaxial with the pitch cylinder axis of the threaded feature. A gage using radial pins as described would be generally limited to use in determining the positional accuracy of a threaded feature only.

Persons of ordinary skill in the art will recognize the gage post in the embodiment of the present invention shown in FIG. 5 as one form of a rotary camshaft. A rotary camshaft or rotatably actuated cam according to the present invention may have a number of other cam shapes, including a helical cam, as will now be described in further detail with reference to FIGS. 10–16. The gage shown in FIG. 10 includes a threaded sleeve 151 and a graduated sleeve 152 which, as will be described, are rotatable with respect to one another about a common axis extending longitudinally through the center of the gage. Sleeve 151 and its threaded end are preferably integrally formed. Graduated sleeve 152 and a friction sleeve or thimble 153 positioned adjacent thereto are relatively fixedly mounted on a central gage post 155 which extends through the gage and includes a helical cam or camshaft 155a within the threaded end of sleeve 151, as shown more clearly in FIGS. 11 and 12. Gage post 155 is rotatably mounted within sleeve 151 and retained axially therein by retaining clip 156, which is secured within a pair of corresponding annular grooves provided for this purpose in sleeve 151 and post 155.

Figure 10:
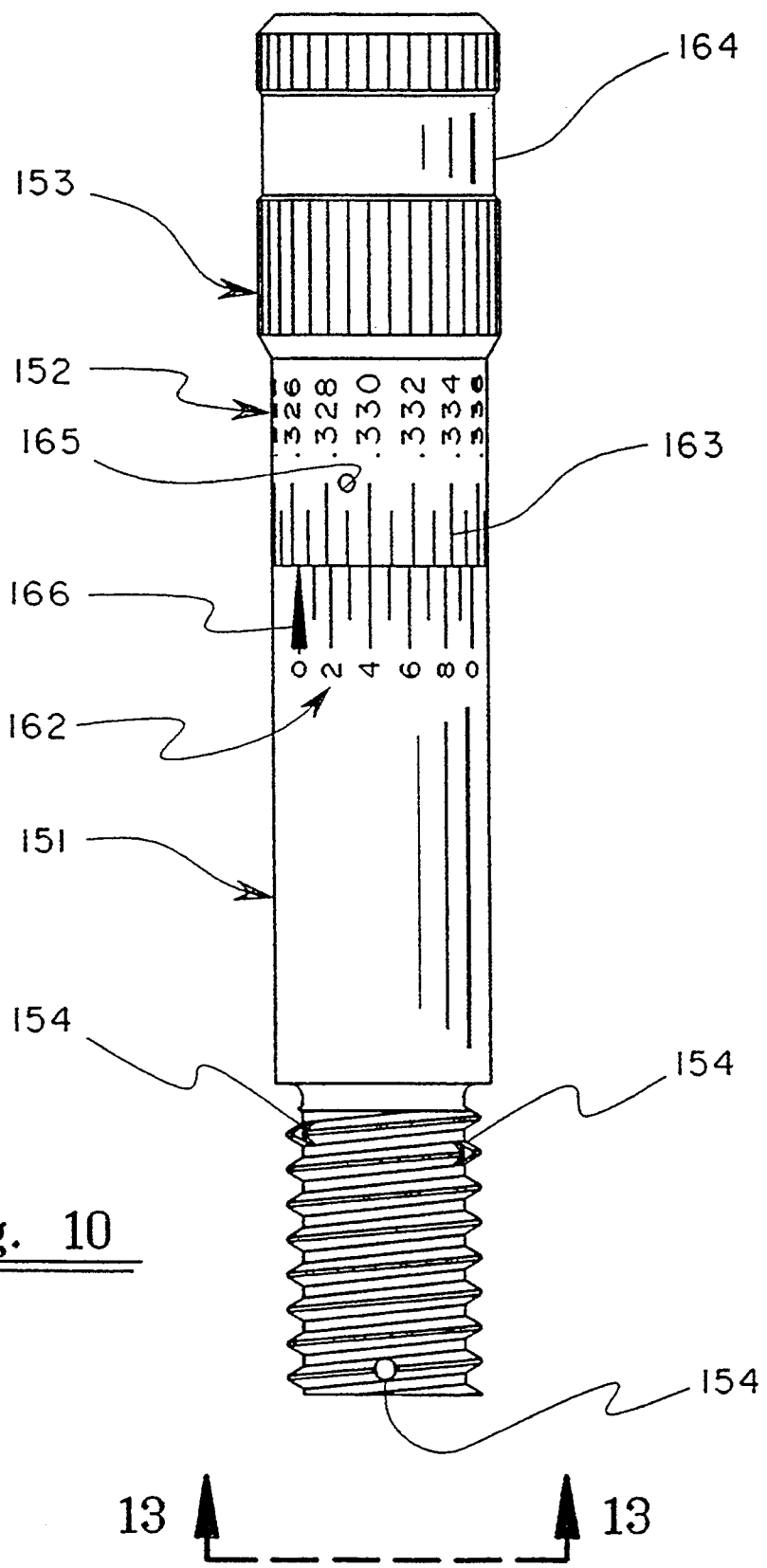
FIG. 10 is a side view of an alternative embodiment of a thread pitch cylinder gage with rotary camshaft according to the present invention.
Figure 12:
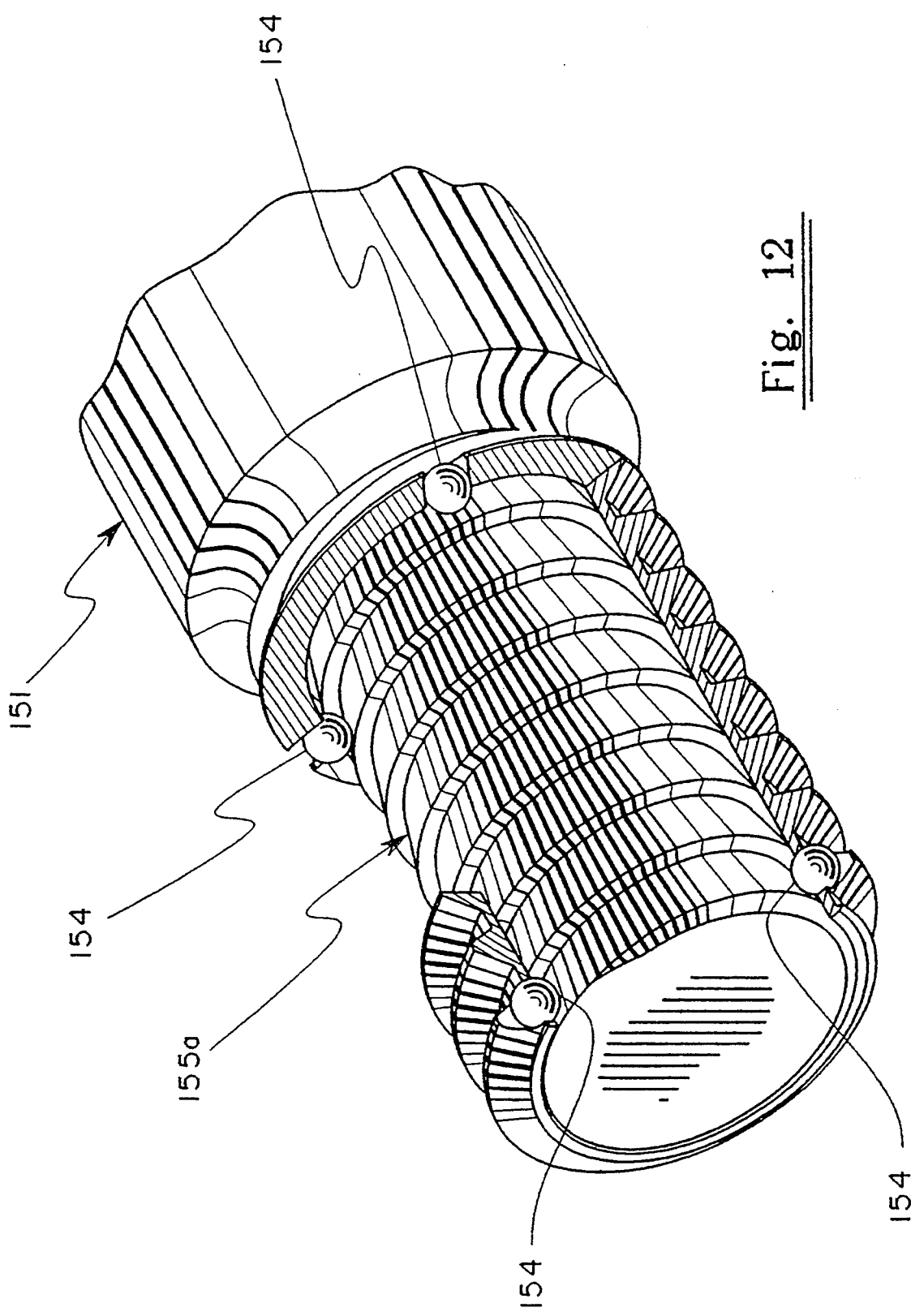
FIG. 12 is an isometric sectional view of the threaded end of the gage of FIGS. 10 and 11, with a portion of the rotary camshaft exposed to further illustrate the helical cam surface.
Figure 13:
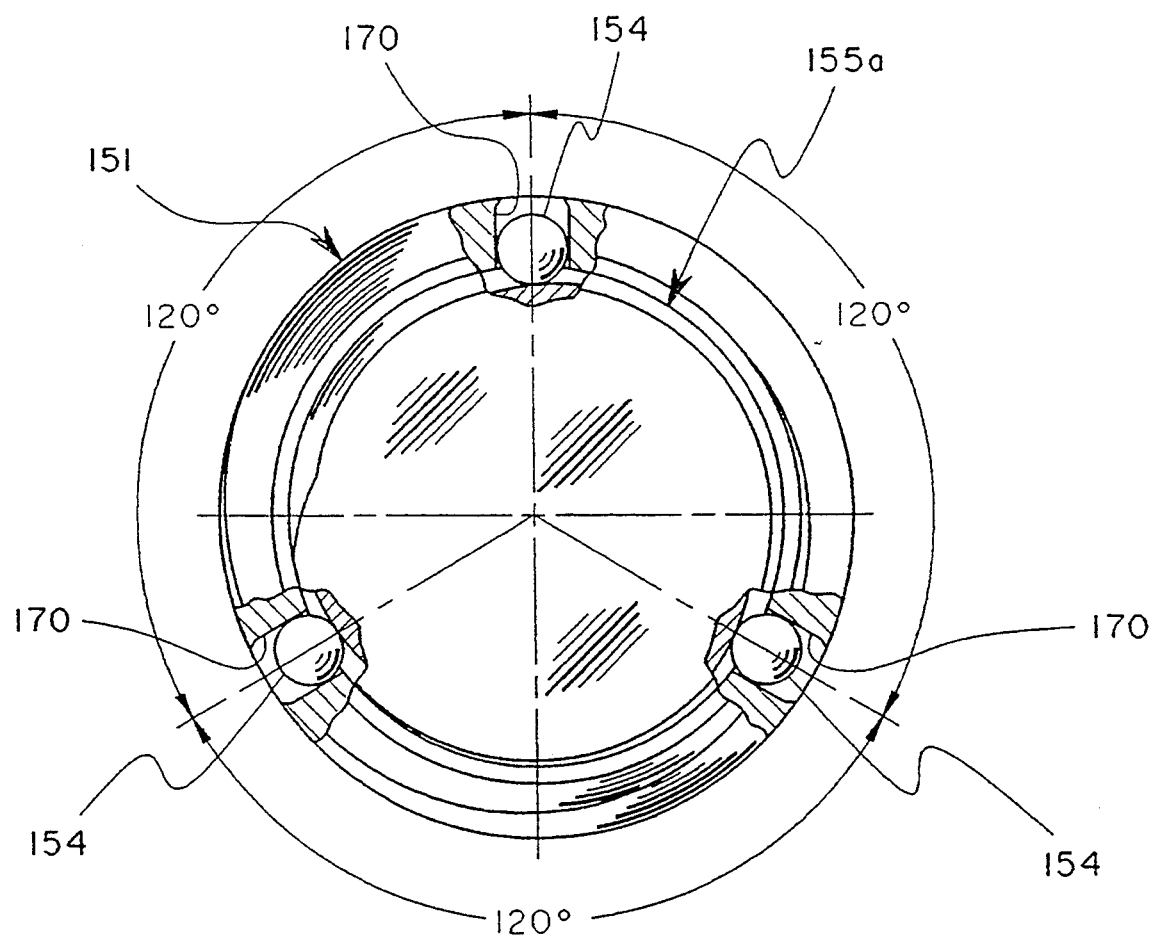
FIG. 13 is an end view of the threaded end of the gage shown in FIG. 10, taken along the lines 13—13, with portions cut away to the respective depths of three balls to further illustrate the orientation of balls within each of two axially spaced sets of cavities.

Two axially spaced sets of three balls 154 are retained between the flanks of threads of the threaded sleeve in radial alignment with respective portions of the camshaft, preferably in the orientation shown in FIGS. 10, 12 and 13. More specifically, the balls in each set are spaced 120° apart from each other around the circumference of the threaded end of sleeve 151, as shown in FIG. 13, a cross-sectional end view in which portions of the threaded end of the gage are cut away to the respective depths of the three balls in one of the two sets to illustrate the 120° circumferential spacing of the balls. The orientation of the balls also includes axial spacing between any two balls in each set, due to the helical pattern of the threads on sleeve 151, as is apparent from, e.g., FIGS. 10 and 12. As also shown in FIGS. 10 and 12, there is a circumferential offset, preferably 60°, between the two axially spaced sets of balls. Camshaft 155a preferably has a uniform helical cam surface, at least in the portions radially adjacent each set of balls, and has a pitch matching that of the threaded end of sleeve 151, thereby providing uniform cam action simultaneously with respect to all balls in the gage. With reference to FIG. 13, for example, the radius of camshaft 155a on gage post 155 varies circumferentially, i.e., as a function of angle of rotation about the camshaft and post axis, in a corresponding manner with respect to each ball in the gage such that, for any given angular position of the camshaft within the gage, the radius of the cam is the same at each point of contact with a ball. As those skilled in the art will appreciate, especially from FIG. 16, the crests 173 of the threaded surface of the helical cam define an outer edge in the shape of a helix which in the disclosed embodiment is cylindrical. The housing or sleeve 151 is also threaded in the preferred embodiment, and the crests 151a of the threads on the housing similarly define an edge surface in the shape of a helix. The edge surface of the helical cam is uniformly spaced from the edge surface of the housing.

Figure 14:
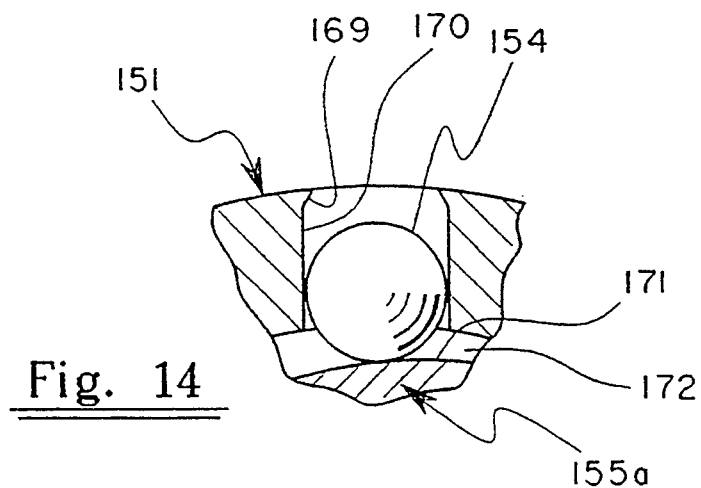
FIG. 14 is an enlarged view of a retaining cavity, associated ball, and portion of the helical cam surface in the gage as illustrated in FIG. 13.
Figure 15:
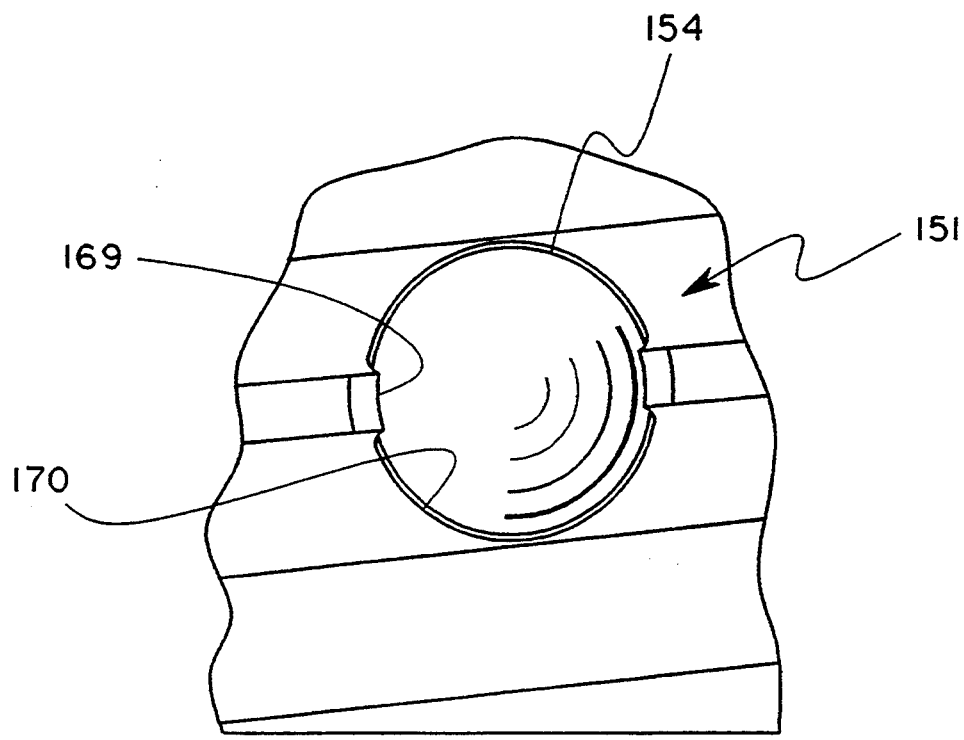
FIG. 15 is an enlarged view of a retaining cavity and associated ball in the gage as illustrated in FIG. 10.

A retaining cavity 170, an associated ball, and a portion of the helical cam surface 172 are shown in detail in FIG. 14, which further illustrates a lip 169 which is made by forming over the outermost corners of retaining cavity 170 to hold the ball in the gage. An external view of the lips 169 on retaining cavity 170 is shown in FIG. 15.

Figure 16:
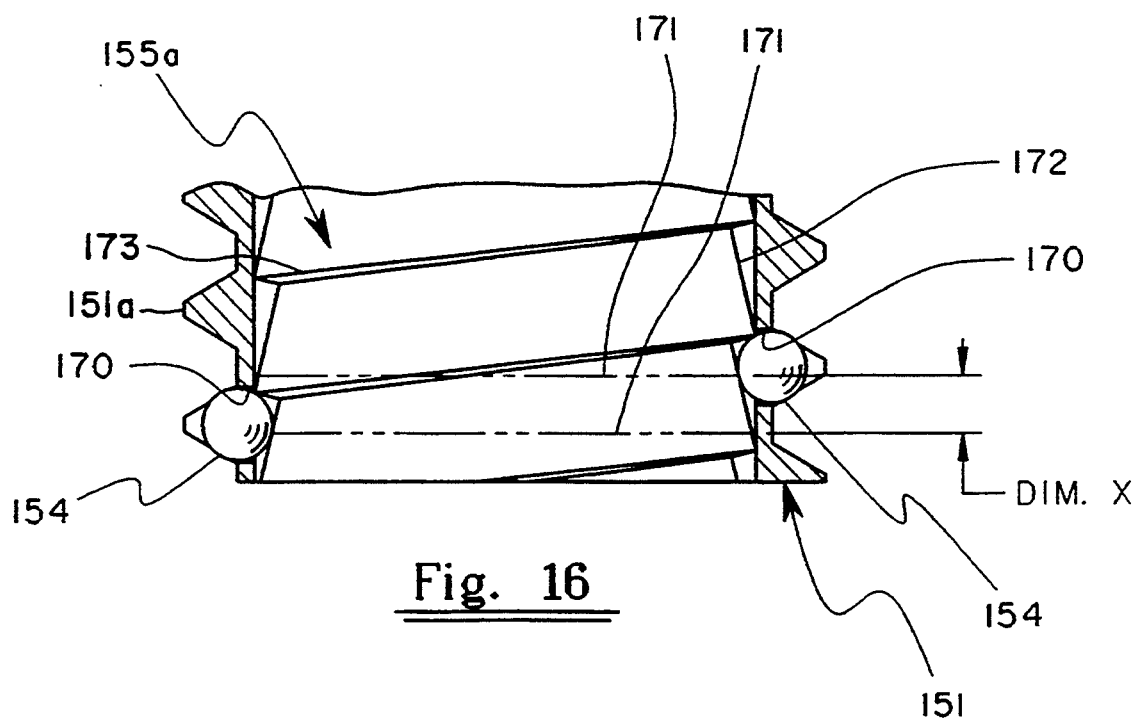
FIG. 16 is a cross-sectional side view of a further alternative embodiment of a gage with rotary camshaft according to the present invention.

Referring now to FIG. 16, each ball 154 contacts a cam surface 172 along a line of contact 171 extending circumferentially around the cam surface. FIG. 16 is a cross-sectional side view of an alternative embodiment in which a helical camshaft such as that described above is rotatably mounted within a threaded sleeve having two retaining cavities 120 located 180° apart from each other as illustrated. The gage may be constructed with just one such set of retaining cavities and corresponding balls, or, if desired, may be constructed with two sets circumferentially offset from each other by 90°. The gage is otherwise the same as the gage shown in FIG. 10. Two balls are sufficient for such a gage to measure the pitch diameter of a threaded hole, although three balls are preferred for some size measurements. Two sets of three balls spaced axially apart are preferable because they cause the gage to better align itself with the pitch cylinder axis of the threaded hole being inspected. As in the gage of FIG. 10, the radius of the cam varies according to position along the line of contact, i.e., circumferentially, and the radial extension of each ball 154 varies accordingly. In FIG. 16, balls 154 are shown in their furthermost retracted position within the retaining cavities.

FIG. 16 also illustrates the aforementioned axial spacing between the balls in each set of balls. The axial distance is a function of the circumferential or angular separation between the balls and of the thread pitch. More specifically, the dimension X between adjacent contact lines 171 is equal to half of the thread pitch in the case of two diametrically opposed balls, and is equal to one-third of the thread pitch in the case of three balls spaced 120° apart.

Figure 17:
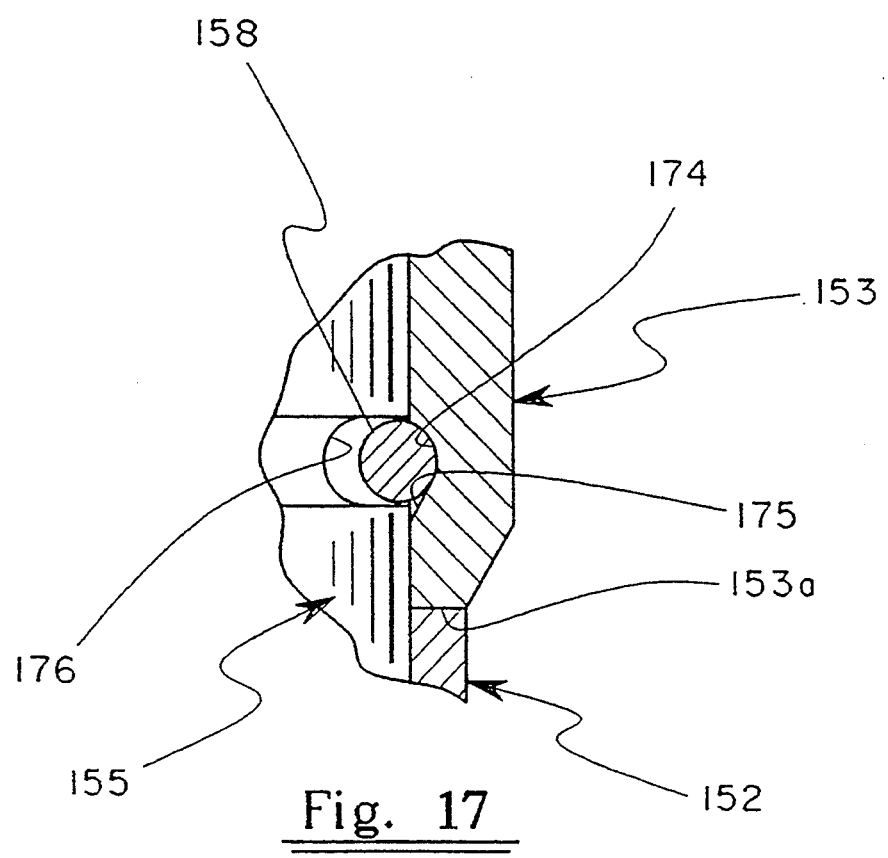
FIG. 17 is an enlarged view of a portion of a retaining clip assembly shown in FIG. 11.

FIG. 17 is an enlarged view of retaining clip 158 and associated grooves within gage post 155 and thimble 153. During assembly of the gage, clip 158 is placed on post 155 and positioned within groove 176. External force is applied to the clip to compress it into groove 176 long enough to allow the leading edge 153a of thimble 153 to pass over as the thimble is slid onto post 155. As groove 174 in thimble 153 passes over clip 158, the clip springs outward into the groove, thereby locking the thimble axially onto the post while allowing the thimble to rotate freely. Tapered surface 175 is provided to facilitate disassembly by transmitting force radially to compress clip 158 into groove 176 as thimble 153 is removed from post 155.

Figure 18:
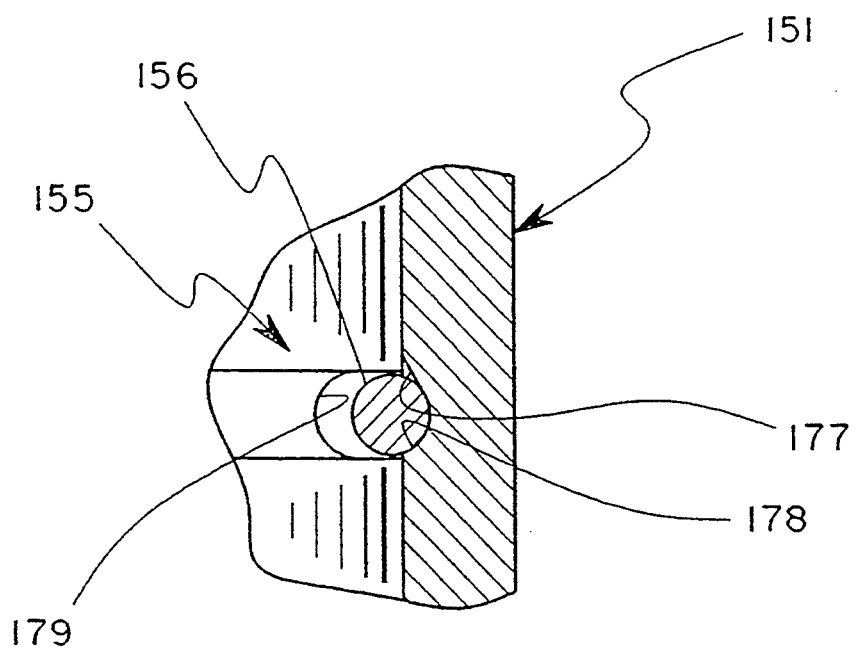
FIG. 18 is an enlarged view of a portion of another retaining clip assembly shown in FIG. 11.

A similar construction is provided for retaining clip 156, as illustrated in FIG. 18. Clip 156 is positioned within groove 179 in post 155 prior to installation of threaded sleeve 151, which is slid over camshaft 155a and then over clip 156, with external force applied to the clip to compress it into groove 179 long enough to allow a shoulder 168 on threaded sleeve 151 to pass over. Clip 156 springs outward into groove 178 when grooves 178 and 179 are aligned, thereby locking the threaded sleeve onto the gage post while allowing the threaded sleeve to rotate freely. Groove 178 is provided with a tapered surface 177 on the side of the groove nearest to shoulder 168 in order to facilitate disassembly by transmitting force radially to compress clip 156 into groove 179 as threaded sleeve 151 is removed from the post.

Returning to FIG. 11, gage post 155 is provided with a recessed groove 159a for a coil slip spring 159 which is secured at one end to post 155, e.g., by means of a 90° bend in the coil tip, with the bent tip fitted into a hole provided for this purpose in the bottom or side of groove 159a. The other end of the spring is unattached, and the spring is selected so as to fit in groove 159a with sufficient outward radial bias to produce a desired level of frictional engagement with thimble 153. Slip spring 159 thus causes gage post 155 to turn with thimble 153 but prevents inaccurate measurements and possible damage to the gage or workpiece by allowing the thimble to slip when the torque applied to the thimble exceeds the force of friction between the spring and thimble. This construction provides a uniform gaging force for all users and thereby ensures consistent, accurate gaging. In the embodiment shown in FIG. 10, the spring is arranged so as to allow slippage when friction thimble 153 is turned clockwise but to bind up in response to counterclockwise rotation of the thimble and thereby effectively lock the thimble to the gage post during counterclockwise rotation.

Graduated sleeve 152 is retained axially on gage post 155 by threaded sleeve 151 and friction thimble 153, and is relatively fixedly mounted by frictional engagement to gage post 155 through a pressure pad 160, which, in the assembled gage, is compressed between sleeve 152 and post 155 in a hole provided in post 155 for this purpose. Pad 160 may be made from any material suitable for the purposes described herein, but is preferably made of urethane, nylon, PVC or similar plastics. Each graduation 163 in FIG. 10 represents 1/1000" (0.001 in.) in a range of pitch diameter values as indicated by the adjacent numbers on the graduated sleeve, as determined by the slope of contact line 171 viewed as a rotating inclined plane, and by the inside diameter of threaded sleeve 151. The gage reading in thousandths of an inch is the lower of the two values corresponding to the two lines 163 closest to the zero line or witness arrow 166, which also serves as one end of a vernier scale 162. The number next to the line on the vernier scale that most nearly coincides with a line 163 on sleeve 152 represents the number of ten-thousandths which must be added to the thousandths reading taken with respect to witness arrow 166 to obtain the actual reading in ten-thousandths of an inch. In the example illustrated in FIG. 10, the actual reading is obtained as follows:

$$0.326'' + 0.0004'' = 0.3264''$$

The gage described above is one form of an indicating thread gage for internal threads and is preferably calibrated with the aid of a thread-setting solid ring gage having a known pitch diameter certified by the manufacturer and traceable to the National Bureau of Standards. The thread gage to be calibrated is inserted into the ring gage to a point at which at least one set of thread balls is in position to engage the internal threads of the ring gage. The friction thimble is then turned until it slips, and the reading from the thread gage is then compared with the known value for the ring gage. Any necessary adjustment is made by rotating sleeve 152 with a spanner wrench designed to fit into hole 165 in the graduated sleeve. The sleeve is rotated until the reading from the thread gage matches the known value from the ring gage. The calibration reading of the thread gage is increased by rotating sleeve 152 clockwise while turning friction thimble 153 in the opposite direction. The calibration reading is decreased by rotating sleeve 152 counterclockwise against an opposing force which is preferably provided with thimble 153 removed and with a spanner wrench inserted into a hole 167 (FIG. 11) provided in gage post 155 for this purpose. Alternatively, the opposing force may be provided by the plunger mechanism shown in FIG. 20.

Figure 11:
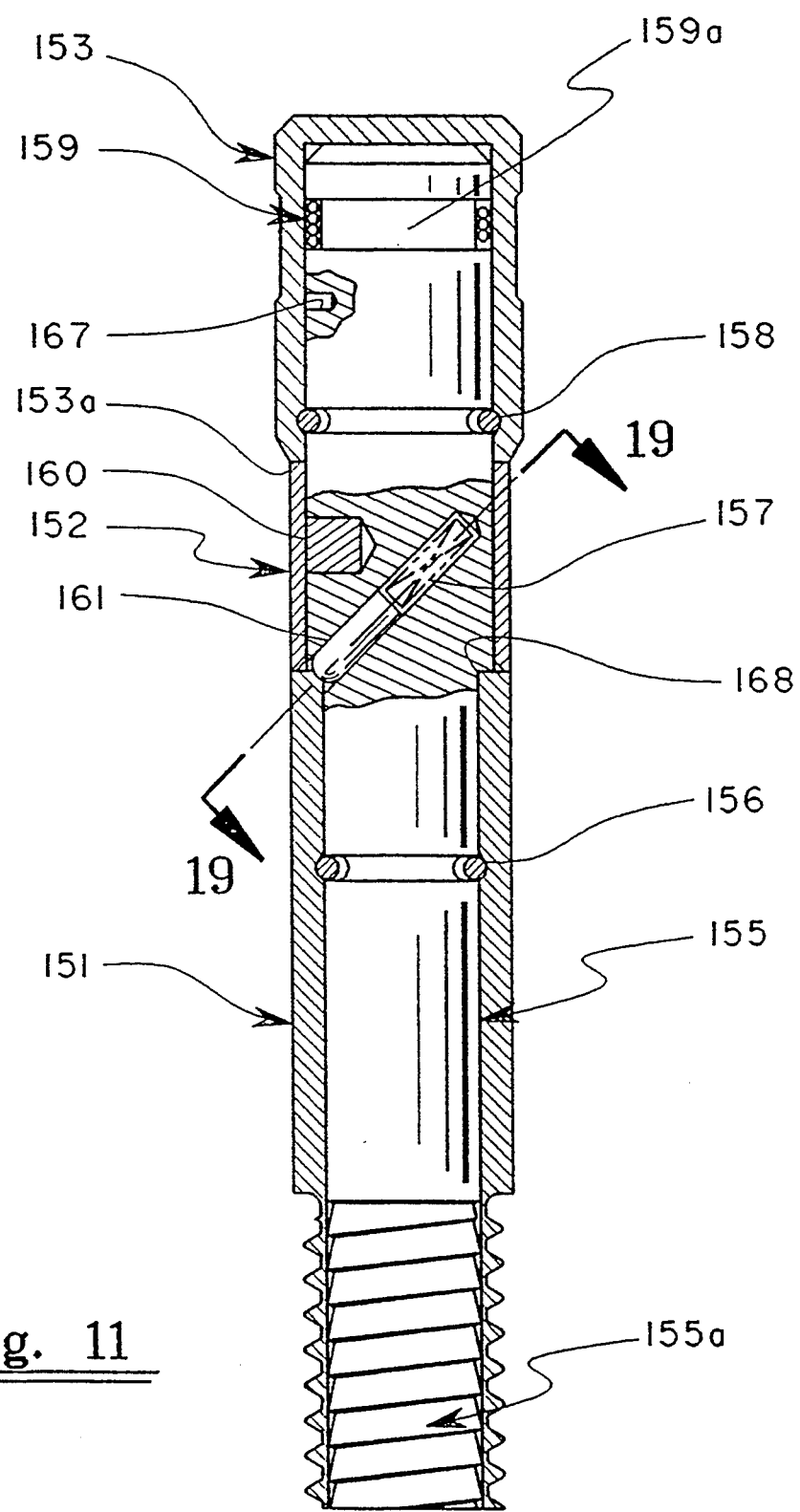
FIG. 11 is a cross-sectional view of the gage illustrated in FIG. 10.
Figure 19:
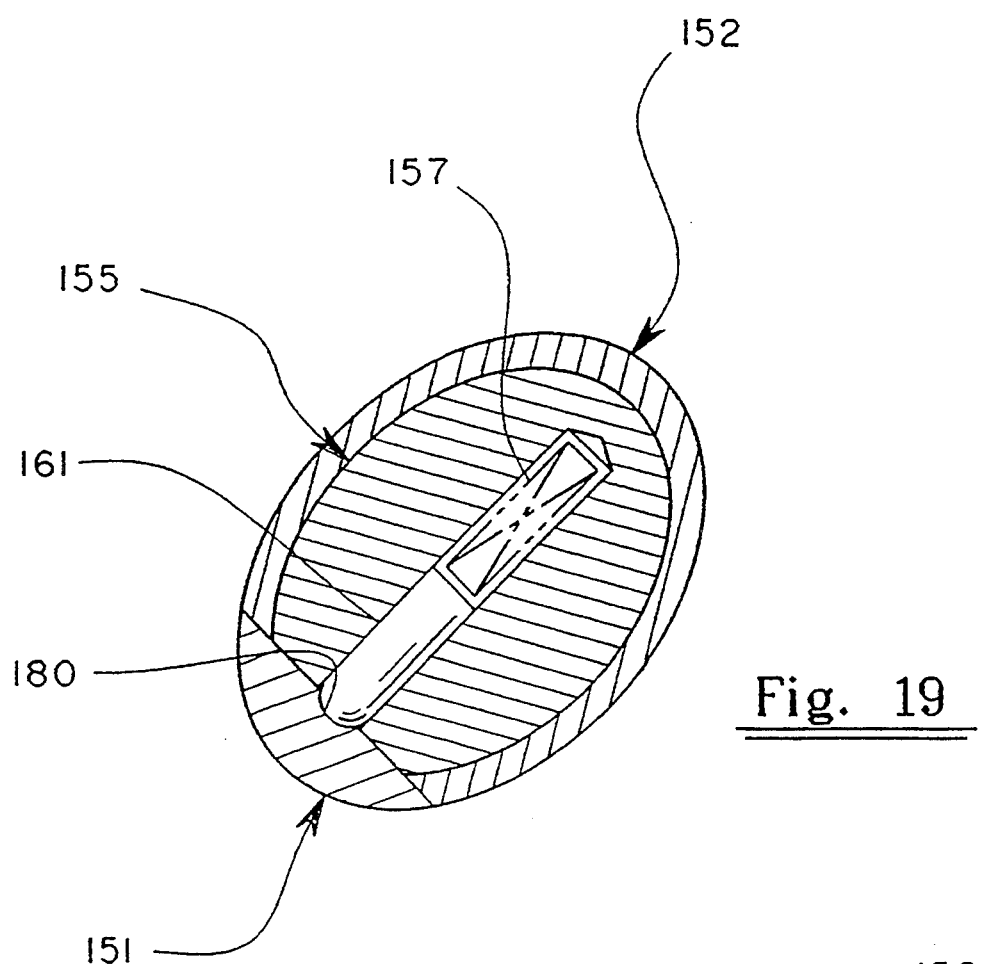
FIG. 19 is a cross-sectional view of the portion of the gage of FIG. 10 lying in the plane indicated by line 19—19 in FIG. 11.
Figure 20:
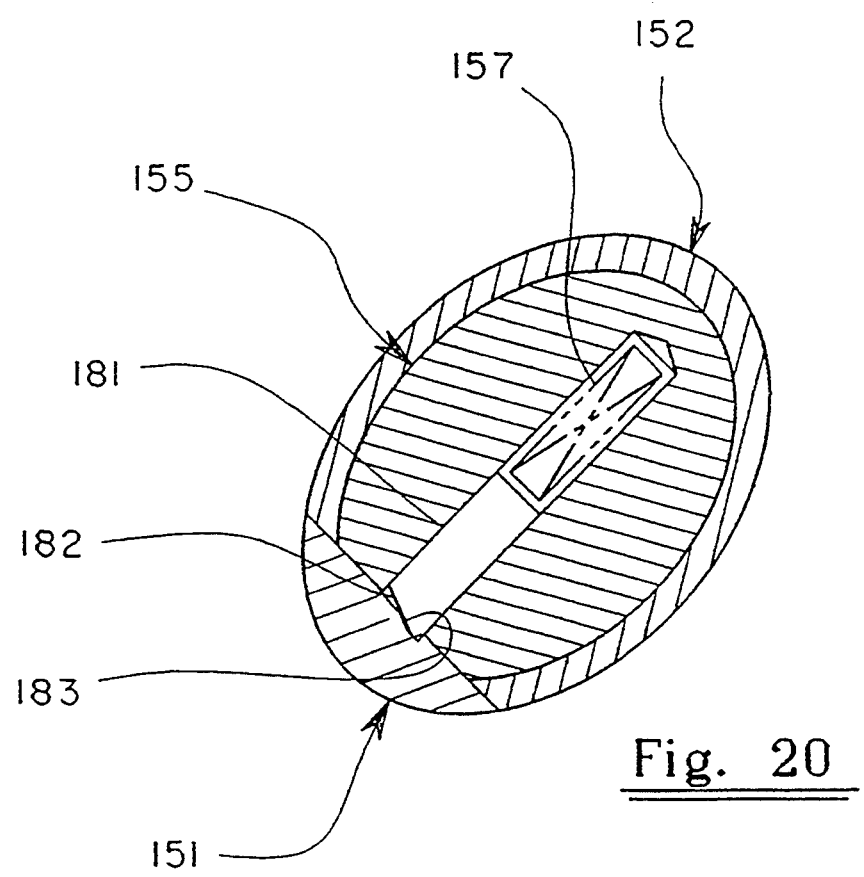
FIG. 20 is a cross-sectional view of the portion of an alternative embodiment of the gage of FIG. 10 lying in the plane indicated by line 19—19 in FIG. 11.

FIGS. 19 and 20 illustrate alternative constructions of a spring-loaded plunger mechanism designed to provide a tactile indication of the angular position of the rotary camshaft. Preferably the position indicated is that in which the balls are in their furthermost retracted position, whereby the tactile indication facilitates insertion and removal of the gage from a threaded hole under inspection. A plunger spring 157 and plunger 161 are positioned as shown in FIG. 19 in a chamber provided in the gage post for this purpose. Spring 157 urges plunger 161 toward shoulder or corner 168, which is adjacent thereto on threaded sleeve 1, and urges the plunger into a groove 180 in shoulder 168 when gage post 155 is rotated to the position in which plunger 161 and groove 180 are aligned. As indicated earlier, this position preferably corresponds to that in which the balls are in the furthermost retracted position. Constructed as shown in FIG. 19, the plunger mechanism permits rotation of post 155 in either direction past the position in which plunger 161 is in groove 180. When rotated from this position, the plunger is forced against the spring which thereupon compresses and allows the plunger to slip out of the groove and into contact with chamfered corner 168. The orientation of the plunger mechanism at an oblique angle with respect to the longitudinal axis of the gage as shown in FIG. 11 permits the use of such a mechanism even in small gages. Direct radial orientation of a plunger mechanism is possible in larger gages, as are ratchet mechanisms.

In the embodiment shown in FIG. 20, a square chamber and corresponding square plunger 181 cooperate to prevent rotation of the plunger within post 155. The outermost surface 182 of plunger 181 is beveled as shown in the drawing so as to prevent counterclockwise rotation of gage post 155 beyond a point defined by notched groove 183 in corner 168. Beveled surface 182 permits clockwise rotation, however, sliding along the correspondingly tapered surface of notched groove 183 during clockwise rotation and thereby forcing plunger 181 against spring 157 into its retracted position.

If desired, beveled surfaces may similarly be provided on the leading surfaces of friction thimble 153 and threaded sleeve 151 so as to facilitate their passage over retaining clips 156 and 158 during assembly.

Although three balls are contained in each of two axially spaced sets of balls in the preferred embodiment of the gage with helical camshaft according to the present invention, either or both sets of balls may contain more than three balls if desired, and additional balls may be located between the two sets of balls, either as a separate intermediate set of balls or as part of a single, continuous, helical pattern of evenly spaced balls. The size of the balls themselves is the principal limitation on the number of balls capable of being contained within such a gage. Furthermore, whereas camshaft 155a has been described above as a continuous helical camshaft, it may alternatively be provided with a helical cam surface only in those portions radially adjacent to each set of balls. That is, the rotary cam portions which engage the balls may be interconnected by a rigid, cylindrical connecting shaft, for example, instead of the continuous helical camshaft described above. The active cam portions may have a right-hand thread configuration, as in the embodiment shown in FIG. 10 et seq., or may have a left-hand thread configuration. Also, two rotary cam portions may be made independently rotatable on separate coaxial gage posts within the thread sleeve, whereby the gage automatically compensates for variations in inside diameter and thus enables proper alignment with the pitch cylinder axis in such a situation.

In a further alternative embodiment of the invention, the gage post is not fixed axially within the threaded sleeve but instead is provided with a threaded portion such as on a spindle screw of a micrometer, and sleeve 151 is provided with corresponding internal threads, both of said threaded portions being axially spaced from the aforementioned threaded end of the sleeve. The spindle screw structure may, for example, have a right-hand thread configuration as in a conventional micrometer, and preferably has a substantially smaller pitch than the helical camshaft. With a right-hand thread configuration for the helical camshaft, rotation of the camshaft during normal operation also produces longitudinal advancement of the camshaft, the combination of which results in increased resolution for the gage. In this alternative embodiment, the threaded sleeve has no shoulder such as shoulder 168 in FIG. 11, nor is there a corresponding shoulder on gage post 155, and the diameters of sleeve 151, sleeve 152 and post 155 are correspondingly modified to permit graduated sleeve 152 to slide over threaded sleeve 151 as post 155 advances within sleeve 151.

It can be seen from the foregoing that the principles of the invention can also be applied to internal bores, gears and splines. That is, whereas the present invention has been described in terms of an internal thread indicating gage as the preferred embodiment for measuring pitch diameter, a gage according to the present invention could alternatively be designed to measure diameter in straight bores or pitch diameter in internal splines and gears, as well as to locate the centerline axis of such features. If desired, the balls engaging the rotary camshaft may be retained within a cylindrical cage, instead of in a threaded portion of sleeve 151, in a gage to be used for inspection of bores.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A gage, comprising:
   a housing having at least one radial cavity therein;
   a helical cam coaxial with said housing, said helical cam rotatably mounted and axially fixed with respect to said housing and said cavity; and
   a contact element radially aligned with respect to said helical cam and each said cavity;
   said helical cam being dimensioned such that upon rotation of said helical cam, each said contact element moves with respect to each said cavity.

2. The gage of claim 1, wherein said housing has a threaded surface.

3. The gage of claim 2, wherein said helical cam is mounted within said housing.

4. The gage of claim 3, wherein said housing has at least three radial cavities therein.

5. The gage of claim 4, wherein said contact elements each comprise a ball retained with a respective cavity in said housing.

6. The gage of claim 5, wherein said housing and said helical cam are generally cylindrical in shape.

7. The gage of claim 6, further comprising a graduated sleeve relatively fixedly mounted to said helical cam.

8. The gage of claim 3, wherein said housing has a set of radial cavities therein axially spaced from said at least one radial cavity.

9. The gage of claim 1, wherein said helical cam is mounted within said housing.

10. The gage of claim 1, wherein said housing has at least three radial cavities therein.

11. The gage of claim 1, wherein said contact elements each comprise a ball retained with a respective cavity in said housing.

12. The gage of claim 1, wherein said housing and said helical cam are generally cylindrical in shape.

13. The gage of claim 1, further comprising a graduated sleeve relatively fixedly mounted to said helical cam.

14. The gage of claim 1, wherein said housing has a set of radial cavities therein axially spaced from said at least one radial cavity.

15. A gage, comprising:

a housing having an outer surface with at least one radial cavity therein;

a helical cam coaxially mounted within said housing, said helical cam including a helical cam portion having an outer edge uniformly spaced from said outer surface of said housing; and a contact element radially aligned with respect to said helical cam portion and each said cavity;

said helical cam portion being dimensioned such that upon rotation of said helical cam, each said contact element moves with respect to each said cavity.

16. The gage of claim 15, wherein said housing has a threaded surface.

17. The gage of claim 16, wherein said housing has at least three radial cavities therein.

18. The gage of claim 17, wherein said contact elements each comprise a ball retained with a respective cavity in said housing.

19. The gage of claim 18, wherein said housing and said helical cam are generally cylindrical in shape.

20. The gage of claim 19, further comprising a graduated sleeve relatively fixedly mounted to said helical cam.

21. The gage of claim 20, wherein said housing has a set of radial cavities therein axially spaced from said at least one radial cavity.

22. The gage of claim 15, wherein said housing has at least three radial cavities therein.

23. The gage of claim 15, wherein said contact elements each comprise a ball retained with a respective cavity in said housing.

24. The gage of claim 15, wherein said housing and said helical cam are generally cylindrical in shape.

25. The gage of claim 15, further comprising a graduated sleeve relatively fixedly mounted to said helical cam.

26. The gage of claim 15, wherein said housing has a set of radial cavities therein axially spaced from said at least one radial cavity.

* * * * *